(12) United States Patent
Jain et al.

(10) Patent No.: US 11,081,792 B2
(45) Date of Patent: Aug. 3, 2021

(54) PHASED ARRAY WITH LOW-LATENCY CONTROL INTERFACE

(71) Applicant: Anokiwave, Inc., San Diego, CA (US)

(72) Inventors: Vipul Jain, Irvine, CA (US); Scott Humphreys, Greensboro, NC (US); David W. Corman, Gilbert, AZ (US); Robert Ian Gresham, San Diego, CA (US); Kristian N. Madsen, Napa, CA (US); Robert J. McMorrow, Concord, MA (US); Jonathan P. Comeau, San Diego, CA (US); Nitin Jain, San Diego, CA (US); Gaurav Menon, San Marcos, CA (US)

(73) Assignee: Anokiwave, Inc., San Diego, CA (US)

( * ) Notice: Subject to any disclaimer, the term of this patent is extended or adjusted under 35 U.S.C. 154(b) by 238 days.

(21) Appl. No.: 16/501,456

(22) Filed: Mar. 7, 2019

(65) Prior Publication Data

US 2020/0350677 A1 Nov. 5, 2020

Related U.S. Application Data

(60) Provisional application No. 62/639,639, filed on Mar. 7, 2018.

(51) Int. Cl.
*H01Q 3/26* (2006.01)
*H01Q 3/36* (2006.01)

(52) U.S. Cl.
CPC .............. *H01Q 3/36* (2013.01); *H01Q 3/267* (2013.01); *H01Q 3/2617* (2013.01)

(58) Field of Classification Search
CPC .......... H01Q 3/26; H01Q 3/36; H01Q 3/2617; H01Q 3/267; H01Q 1/2283; H01Q 21/065; H04B 7/086
See application file for complete search history.

(56) References Cited

U.S. PATENT DOCUMENTS 5,027,126 A * 6/1991 Basehgi .................. H01Q 3/38
342/372
5,162,803 A 11/1992 Chen
(Continued)

FOREIGN PATENT DOCUMENTS

| JP | 2007-178332 A | 7/2007 |
| JP | 2014-036325 A | 2/2014 |
| WO | 2016/022220 A3 | 5/2016 |

OTHER PUBLICATIONS

Bailey, General Layout Guidelines for RF and Mixed-Signal PCBs, Maxim Integrated, Tutorial 5100, 10 pages, Sep. 14, 2011.
(Continued)

*Primary Examiner* — Awat M Salih
(74) *Attorney, Agent, or Firm* — Nutter McClennen & Fish LLP

(57) ABSTRACT

A phased array system has a plurality of beam-forming elements, and a plurality of beam-forming integrated circuits in communication with the beam-forming elements. Each beam-forming integrated circuit has a corresponding register bank with a plurality of addressable and programmable register sets. In addition, each beam-forming integrated circuit has at least two different types of beam-forming ports. Specifically, each beam-forming element has a serial data port for receiving serial messages, and a parallel mode data port for receiving broadcast messages. Both the serial and broadcast messages manage the data in its register bank. The beam-forming integrated circuits receive the broadcast messages in parallel with the other beam-forming integrated circuits, while the beam-forming integrated circuits receive the serial messages serially—sequentially with regard to other beam-forming integrated circuits.

25 Claims, 11 Drawing Sheets

(56) References Cited

U.S. PATENT DOCUMENTS

| | | |
|---|---|---|
| 5,448,250 A | 9/1995 | Day |
| 5,469,851 A | 11/1995 | Lipschutz |
| 5,724,666 A | 3/1998 | Dent |
| 5,920,278 A | 7/1999 | Tyler et al. |
| 5,977,994 A | 11/1999 | Greenberg et al. |
| 6,021,388 A | 2/2000 | Otsuka et al. |
| 6,266,528 B1 | 7/2001 | Farzaneh |
| 7,087,993 B2 | 8/2006 | Lee |
| 7,129,568 B2 | 10/2006 | Lee et al. |
| 8,558,398 B1 | 10/2013 | Seetharam |
| 8,866,283 B2 | 10/2014 | Chen et al. |
| 9,077,265 B2 | 7/2015 | Tsukamoto et al. |
| 9,445,157 B2 | 9/2016 | Barrett |
| 10,320,093 B2 | 6/2019 | Madsen et al. |
| 2002/0070895 A1 | 6/2002 | Vail et al. |
| 2002/0085651 A1 | 7/2002 | Gu |
| 2005/0017352 A1 | 1/2005 | Lee |
| 2005/0082645 A1 | 4/2005 | Lee et al. |
| 2005/0083797 A1 | 4/2005 | Shigeeda et al. |
| 2005/0098860 A1 | 5/2005 | Lai et al. |
| 2005/0130595 A1 | 6/2005 | Shurvinton et al. |
| 2006/0006505 A1 | 1/2006 | Chiang et al. |
| 2008/0007453 A1 | 1/2008 | Vassilakis et al. |
| 2008/0137482 A1 | 6/2008 | Kang et al. |
| 2008/0268790 A1 | 10/2008 | Shi et al. |
| 2009/0256752 A1 | 10/2009 | Akkermans et al. |
| 2010/0210219 A1 | 8/2010 | Stirling-Gallacher et al. |
| 2011/0198742 A1 | 8/2011 | Danno et al. |
| 2012/0313219 A1 | 12/2012 | Chen et al. |
| 2013/0050055 A1 | 2/2013 | Paradiso et al. |
| 2013/0187830 A1 | 7/2013 | Warnick et al. |
| 2014/0077996 A1 | 3/2014 | Mayo |
| 2014/0210667 A1 | 7/2014 | Wang et al. |
| 2014/0210668 A1 | 7/2014 | Wang et al. |
| 2014/0348035 A1 | 11/2014 | Corman et al. |
| 2015/0325913 A1 | 11/2015 | Vagman |
| 2016/0248157 A1 | 8/2016 | Rao et al. |
| 2016/0359230 A1 | 12/2016 | Wang et al. |
| 2017/0070258 A1 | 3/2017 | Shih |
| 2017/0230094 A1 | 8/2017 | Da Silva et al. |
| 2017/0237180 A1 | 8/2017 | Corman et al. |
| 2017/0311179 A1 | 10/2017 | Fujio |
| 2018/0019517 A1 | 1/2018 | Allen et al. |
| 2018/0062274 A1* | 3/2018 | Madsen ................ H01Q 21/22 |
| 2018/0331818 A1 | 11/2018 | Aouini et al. |
| 2019/0312359 A1 | 10/2019 | Madsen et al. |
| 2020/0044336 A1 | 2/2020 | Dani |

OTHER PUBLICATIONS

International Searching Authority, International Search Report—International Application No. PCT/US2016/052215, dated May 29, 2017, together with the Written Opinion of the International Searching Authority, 17 pages.

International Searching Authority, International Search Report—International Application No. PCT/US2017/042311, dated Oct. 30, 2017, together with the Written Opinion of the International Searching Authority, 9 pages.

International Searching Authority, International Search Report—International Application No. PCT/US2017/048913, dated Jan. 11, 2018, together with the Written Opinion of the International Searching Authority, 14 pages.

International Searching Authority, International Search Report—International Application No. PCT/US2019/021202, dated May 15, 2019, together with the Written Opinion of the International Searching Authority, 7 pages.

Ismail, Introduction to RF CMOI IC Design for Wireless Applications, Analog VLSI Lab, the Ohio State University, 117 pages, undated.

Jain, "Layout Review Techniques for Low Power RF Designs," Application Note AN098, Texas Instruments, 15 pages, 2012.

Maxim,—"5GHz, 4-Channel MIMO Transmitter", MAX2850, Maxim Integrated Products, Inc., 33 pages, 2010.

Silicon Labs "Layout Design Guide for the Si4455/435x RF ICs", AN685, Silicon Laboratories, 22 pages, 2014.

Ismail, "Introduction to RF CMOI IC Design for Wireless Applications, Analog VLSI Lab," The Ohio State University, 117 pages, dated Dec. 11, 2001.

* cited by examiner

PHASED ARRAY WITH LOW-LATENCY CONTROL INTERFACE

RELATED APPLICATIONS

This application claims the benefit of U.S. Provisional Patent Application No. 62/639,639, filed on Mar. 7, 2018, the entire contents of which are incorporated herein by reference.

FIELD OF THE INVENTION

The invention generally relates to phased arrays and, more particularly, the invention relates to more efficiently managing beam-forming integrated circuits.

BACKGROUND OF THE INVENTION

Active electronically steered antenna systems ("AESA systems," a type of "phased array system") form electronically steerable beams for a wide variety of radar and communications systems. To that end, AESA systems typically have a plurality of beam-forming elements (e.g., antennas) that transmit and/or receive energy so that the signal on each beam-forming element can be coherently (i.e., in-phase and amplitude) combined (referred to herein as "beam-forming" or "beam steering"). Specifically, many AESA systems implement beam steering by providing a unique radio frequency ("RF") phase shift and gain setting (phase and gain together constitute a complex beam weight) between each beam-forming element and a beam-forming or summation point.

The number and type of beam-forming elements in the phased array system can be selected or otherwise configured specifically for a given application. A given application may have a specified minimum equivalent/effective isotropically radiated power ("EIRP") for transmitting signals. Additionally, or alternatively, a given application may have a specified minimum G/T (analogous to a signal-to-noise ratio) for receiving signals, where:

G denotes the gain or directivity of an antenna, and
T denotes the total noise temperature of the receive system including receiver noise figure, sky temperature, and feed loss between the antenna and input low noise amplifier.

SUMMARY OF VARIOUS EMBODIMENTS

In accordance with one embodiment of the invention, a phased array system has multiple beam-forming elements, and multiple beam-forming integrated circuits in communication with the beam-forming elements. Each beam-forming integrated circuit can have a corresponding register bank with a plurality of addressable and programmable register sets. In addition, each beam-forming integrated circuit can have at least two different types of digital control interface ports. Specifically, each beam-forming element can have a serial data port for receiving serial messages and a parallel mode data port for receiving broadcast messages. Both the serial and broadcast messages can manage the data in its register bank. The beam-forming integrated circuits can receive the broadcast messages in parallel with the other beam-forming integrated circuits. Additionally, the beam-forming integrated circuits can receive the serial messages serially—sequentially with regard to other beam-forming integrated circuits (e.g., in a daisy chain configuration).

The phased array system also may have a controller that communicates with the beam-forming integrated circuits. To that end, the controller may have a parallel mode data output coupled with the parallel mode data port of the beam-forming integrated circuits. Moreover, the beam-forming integrated circuits can be switchable between any of a serial mode to receive data in the serial data port only and a parallel mode to receive data in the parallel mode data port only. In addition or instead, the beam-forming integrated circuits can be switchable to or from a hybrid mode that receives data in both a serial mode and a parallel mode.

Each of the programmable register sets may include a variety of different types of data to control the operation of the phased array system. Among other things, the register sets may include one or more of gain data corresponding to different beam characteristics of the phased array system, phase data corresponding to different beam characteristics of the phased array system, three-dimensional beam steering data, and gain compensation data to compensate for temperature fluctuations of the system.

Each beam-forming integrated circuit can be implemented as an application specific integrated circuit (ASIC), field programmable gate array (FPGA) or other circuitry. Moreover, each beam-forming integrated circuit may include at least one of a clock input for receiving a reference clock signal, a chip select input for enabling the integrated circuit to be programmed, and a load enable input for loading data into the programmable register sets.

The beam-forming integrated circuits may couple their serial ports to form a daisy chain. For example, for each beam-forming integrated circuit, the serial data port may include both a serial data input and a serial data output. Thus, in some embodiments, the beam-forming integrated circuits may include a first beam-forming integrated circuit and a second beam-forming integrated circuit. The serial data port of the first beam integrated circuit may include a first serial data input and a first serial data output. In a corresponding manner, the serial data port of the second beam-forming integrated circuit may include a second serial data input and a second serial data output. As serial ports, the first serial data output may be coupled with the second serial data input, the first serial data input may be coupled with an upstream serial data output of another of the plurality of beam-forming integrated circuits, and the second serial data output may be coupled with a downstream serial data input of yet another of the plurality of beam-forming integrated circuits.

Each beam-forming integrated circuit may have multiple channels. Thus, the programmable register sets in each integrated circuit may have data for each of the channels. In some implementations, the parallel and serial connections operate regardless of whether the system is in a transmit or receive mode. To that end, the beam-forming integrated circuits may include one or more of receive only beam-forming integrated circuits, transmit only beam-forming integrated circuits, and dual transmit/receive beam-forming integrated circuits.

In accordance with another embodiment of the invention, a method controls a phased array system having multiple beam-forming integrated circuits. Each beam-forming integrated circuit can have a corresponding register bank with addressable and programmable register sets, and two ports; namely, a serial data port for receiving serial messages that manage the data in its register bank and a parallel mode data port for receiving broadcast messages that manage the data in its register bank. The method also distributes a broadcast message having register address information to the beam-forming integrated circuits, via their respective parallel mode data ports, in parallel across a signal distribution system. For each beam-forming integrated circuit, the method retrieves data from addressable register sets having the address of the register address information in the broadcast message, and applies the retrieved data to change the operation of the phased array system. In some embodiments, the method can further include setting the phased array system in a serial mode to receive data in the serial data port only, a parallel mode to receive data in the parallel mode data port only, or a hybrid mode that receives data in both the serial mode and the parallel mode.

In some embodiments, the programmable register sets of each beam-forming integrated circuit includes one or more of gain data corresponding to different beam characteristics of the phased array system, phase data corresponding to different beam characteristics of the phased array system, three-dimensional beam steering data, gain compensation data to compensate for temperature fluctuations of the system, and receiver linearity data. The phased array system can have multiple beam-forming elements electrically coupled with the beam-forming integrated circuits.

In some embodiments, the method can include applying different amplitude weights to different ones of the beam-forming elements. The method can include changing gain data as a function of temperature fluctuations in the phased array system. In some embodiments, the method can further include receiving a serial message at the serial data port of a first of the beam-forming integrated circuits and forwarding the serial message to a daisy chain of serial data ports of different beam-forming integrated circuits. In some embodiments, the beam-forming integrated circuits can include receive only beam-forming integrated circuits, transmit only beam-forming integrated circuits, dual transmit/receive beam-forming integrated circuits, or any combination thereof.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an active electronically steered antenna system can more rapidly change its operation during use. For example, the system can more rapidly change the direction and other beam characteristics during signal reception and/or signal transmission. Additionally, the system can more rapidly compensate for temperature fluctuations. To that end, the system controls its beam-forming integrated circuits with a parallel transmission to the relevant integrated circuits. As described in the illustrated embodiments below, each of the beam-forming integrated circuits is configured to include a parallel mode data interface port for receiving control messages broadcast from a controller in order to change certain characteristics of a beam produced by beam-forming elements of the antenna system more rapidly than prior art methods known to the inventors.

Details of illustrative embodiments are discussed below.

Figure 1:
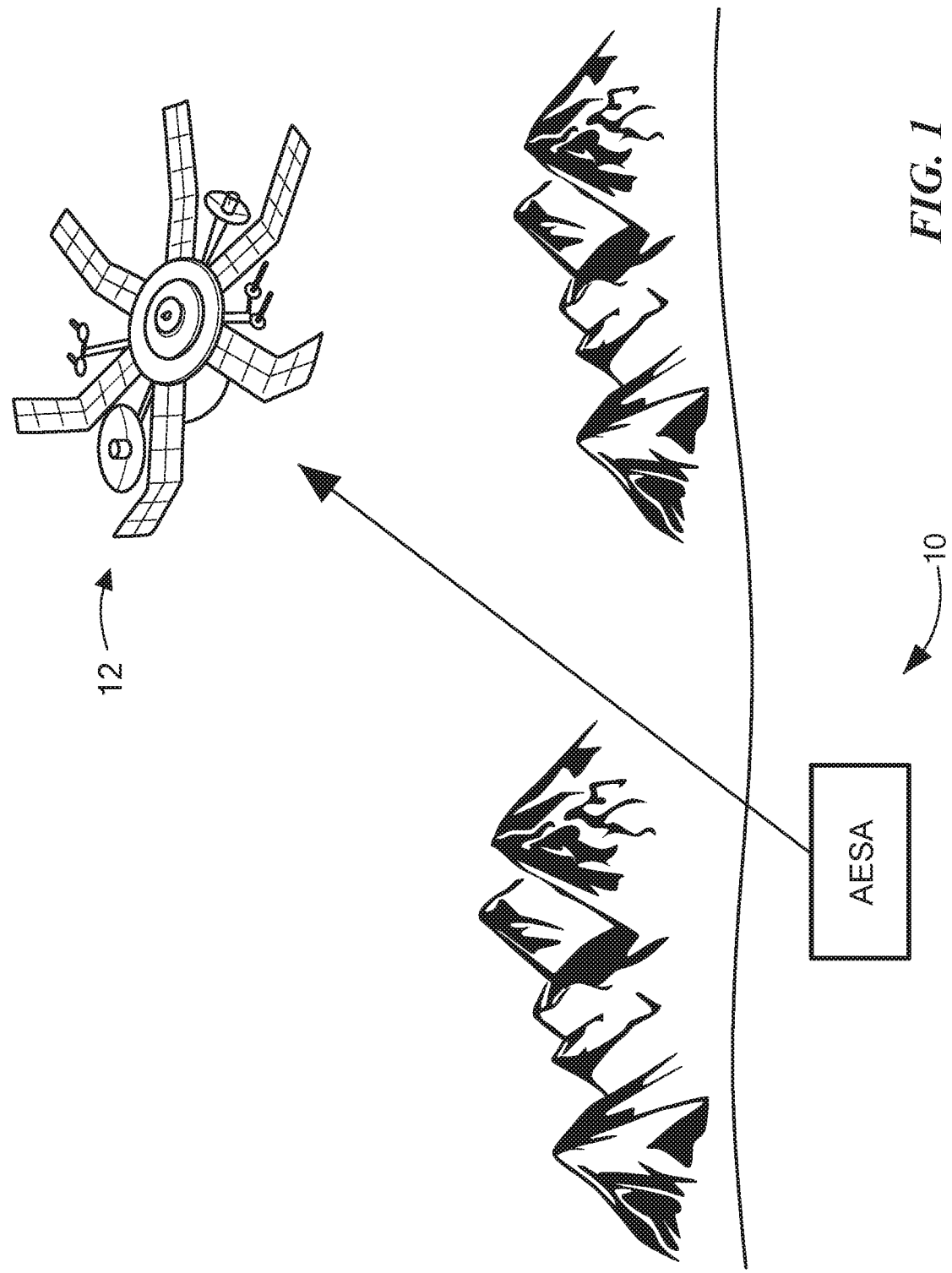
FIG. 1 schematically shows an active electronically steered antenna system ("AESA system") configured in accordance with illustrative embodiments of the invention and communicating with a satellite.

FIG. 1 schematically shows an active electronically steered antenna system ("AESA system 10") configured in accordance with illustrative embodiments of the invention and communicating with an orbiting satellite 12. A phased array (discussed below and identified by reference number "10A") implements the primary functionality of the AESA system 10. Specifically, as known by those skilled in the art, the phased array forms one or more of a plurality of electronically steerable beams that can be used for a wide variety of applications. As a satellite communication system, for example, the AESA system 10 preferably is configured operate at one or more satellite frequencies. Among others, those frequencies may include the Ka-band, Ku-band, and/or X-band.

The satellite communication system may be part of a cellular network operating under a known cellular protocol, such as the 3G, 4G, or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 (implementing the noted phased array 10A) in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

Figure 2A:
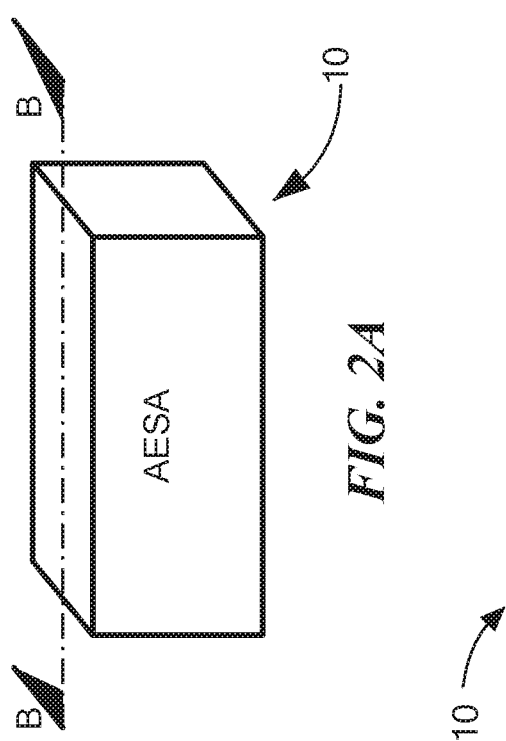
FIGS. 2A and 2B schematically show generalized diagrams of an AESA system that may be configured in accordance with illustrative embodiments of the invention.
Figure 2B:
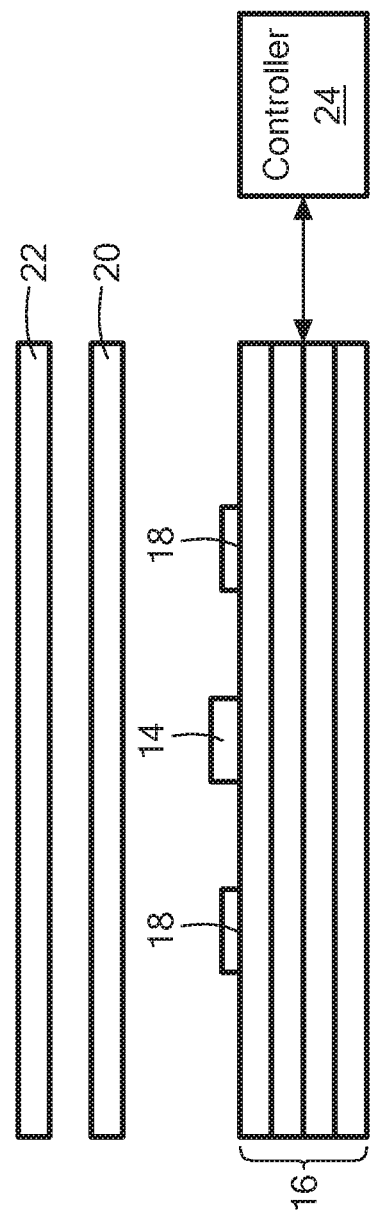

FIGS. 2A and 2B schematically show generalized diagrams of the AESA system 10 configured in accordance with illustrative embodiments of the invention. Specifically, FIG.

2A schematically shows a block diagram of the AESA system 10, while FIG. 2B schematically shows a cross-sectional view of a small portion of the same AESA system 10 across line B-B. This latter view shows a single silicon integrated circuit 14 mounted onto a substrate 16 between two transmit, receive, and/or dual transmit/receive elements 18, i.e., on the same side of a supporting substrate 16 and juxtaposed with the two elements 18. In alternative embodiments, however, the integrated circuit 14 could be on the other side/surface of the substrate 16. The AESA system 10 also has a polarizer 20 to selectively filter signals to and from the phased array 10A, and a radome 22 to environmentally protect the phased array of the system 10. A separate antenna controller 24 (FIG. 2B) electrically connects with the phased array to calculate beam steering vectors for the overall phased array, and to provide other control functions.

Figure 3A:
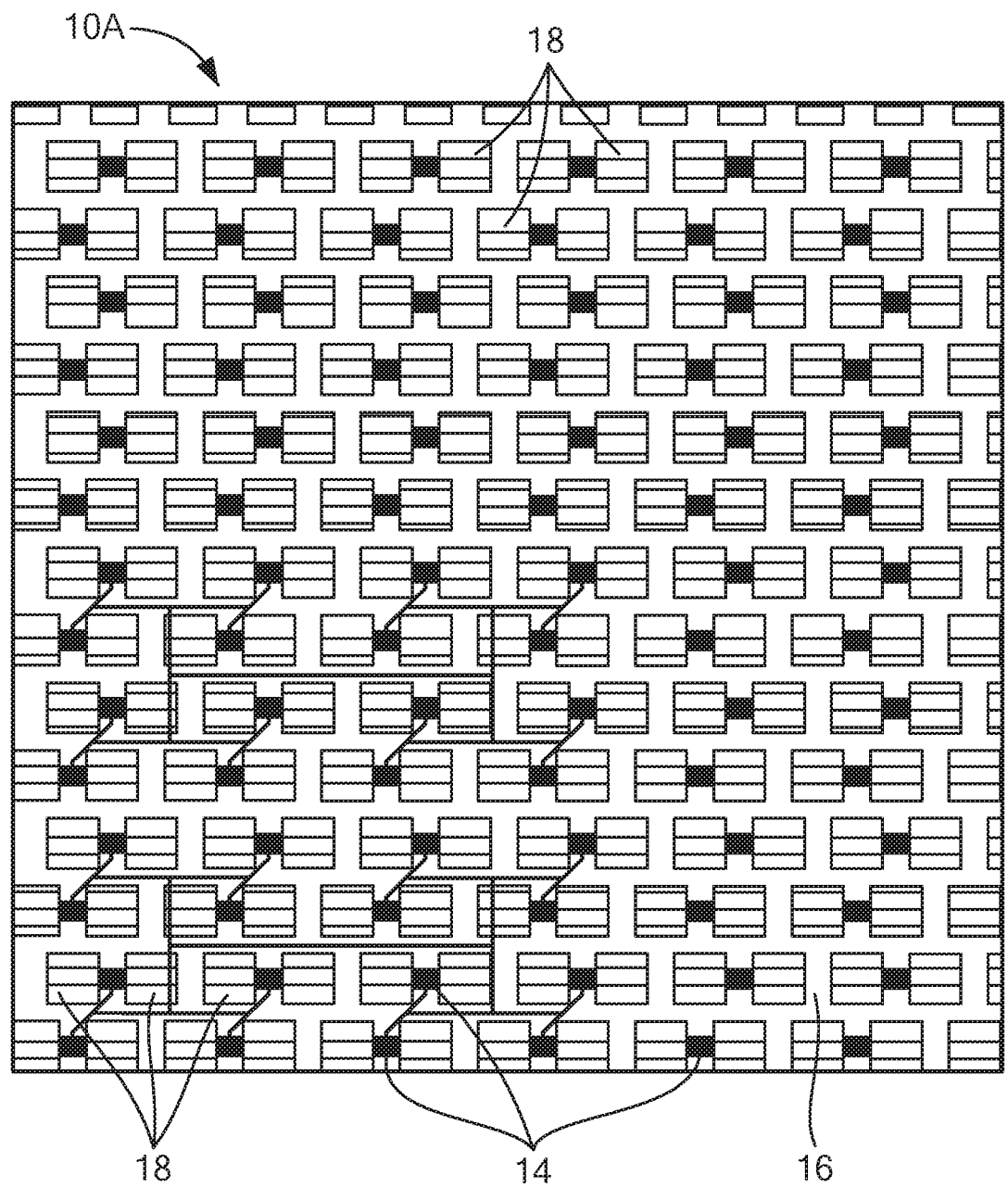
FIG. 3A schematically shows a plan view of a laminar printed circuit board portion of an AESA configured in accordance with illustrative embodiments of the invention.

FIG. 3A schematically shows a plan view of a primary portion of an AESA system 10 that may be configured in accordance with illustrative embodiments of the invention. In a similar manner, FIG. 3B schematically shows a close-up of a portion of the phased array 10A of FIG. 3A.

Specifically, the AESA system 10 of FIG. 3A is implemented as a laminar phased array 10A having a laminated printed circuit board 16 (i.e., acting as the substrate and also identified by reference number "16") supporting the above noted plurality of elements 18 and integrated circuits 14. The elements 18 preferably are formed as a plurality of square or rectangular patch antennas oriented in a triangular patch array configuration. In other words, each element 18 forms a triangle with two other adjacent elements 18. When compared to a rectangular lattice configuration, this triangular lattice configuration requires fewer elements 18 (e.g., about 15 percent fewer in some implementations) for a given grating lobe free scan volume. Other embodiments, however, may use other lattice configurations, such as a pentagonal configuration or a hexagonal configuration. Moreover, despite requiring more elements 18, some embodiments may use a rectangular lattice configuration. Like other similar phased arrays, the printed circuit board 16 also may have a ground plane (not shown) that electrically and magnetically cooperates with the elements 18 to facilitate operation.

Figure 3B:
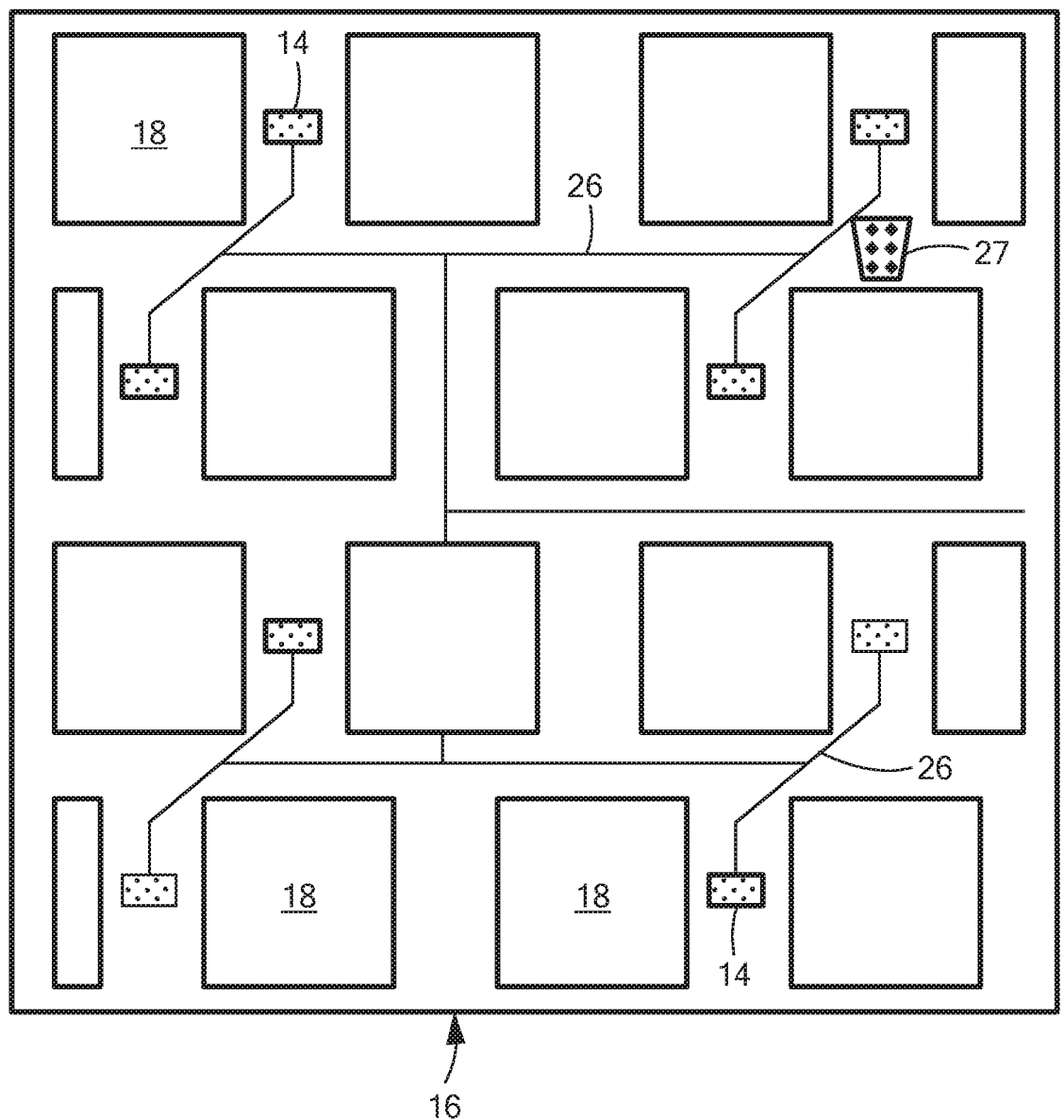
FIG. 3B schematically shows a close-up of a portion of the laminated printed circuit board of FIG. 3A.

Indeed, the array shown in FIGS. 3A and 3B is a small phased array 10A. Those skilled in the art can apply principles of illustrative embodiments to laminar phased arrays 10A with hundreds, or even thousands, of elements 18 and integrated circuits 14. In a similar manner, those skilled in the art can apply various embodiments to smaller phased arrays 10A.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional semiconductor fabrication processes, such as by depositing one or more successive metal layers on the printed circuit board 16. Accordingly, using such fabrication processes, each radiating element 18 in the phased array 10A should have a very low profile.

The phased array 10A can have one or more of any of a variety of different functional types of elements 18. For example, the phased array 10A can have transmit-only elements 18, receive-only elements 18, and/or dual mode receive and transmit elements 18 (referred to as "dual-mode elements 18"). The transmit-only elements 18 are configured to transmit outgoing signals (e.g., burst signals) only, while the receive-only elements 18 are configured to receive incoming signals only. In contrast, the dual-mode elements 18 are configured to either transmit outgoing burst signals, or receive incoming signals, depending on the mode of the phased array 10A at the time of the operation. Specifically, when using dual-mode elements 18, the phased array 10A can be in either a transmit mode, or a receive mode. The noted controller 24, at least in part, controls the mode and operation of the phased array 10A, as well as other array functions.

The AESA system 10 has a plurality of the above noted integrated circuits 14 (mentioned above with regard to FIG. 2B) for controlling operation of the elements 18. Those skilled in the art often refer to these integrated circuits 14 as "beam steering integrated circuits," or "beam-forming integrated circuits."

Each integrated circuit 14 preferably is configured with at least the minimum number of functions to accomplish the desired effect. Indeed, integrated circuits 14 for dual mode elements 18 are expected to have some different functionality than that of the integrated circuits 14 for the transmit-only elements 18 or receive-only elements 18. Accordingly, integrated circuits 14 for such non-dual-mode elements 18 typically have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
  phase shifting,
  amplitude controlling/beam weighting,
  switching between transmit mode and receive mode,
  output amplification to amplify output signals to the elements 18,
  input amplification for received RF signals (e.g., signals received from the satellite 12), and
  power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches.

Each integrated circuit 14 preferably operates on at least one element 18 in the array. For example, one integrated circuit 14 can operate on two or four different elements 18. Of course, those skilled in the art can adjust the number of elements 18 sharing an integrated circuit 14 based upon the application. For example, a single integrated circuit 14 can control two elements 18, three elements 18, five elements 18, six elements 18, seven elements 18, eight elements 18, etc., or some range of elements 18. Sharing the integrated circuits 14 between multiple elements 18 in this manner reduces the required total number of integrated circuits 14, correspondingly reducing the required size of the printed circuit board 16.

As noted above, the dual-mode elements 18 may operate in a transmit mode, or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms of the integrated circuit 14. Instead, such embodiments may duplex at the element 18. This process can be performed by isolating one of the elements 18 between transmit and receive by an orthogonal feed connection.

RF interconnect and/or beam-forming lines 26 electrically connect the integrated circuits 14 to their respective elements 18. To further minimize the feed loss, illustrative embodiments mount the integrated circuits 14 as close to their respective elements 18 as possible. Specifically, this close proximity preferably reduces RF interconnect line lengths, reducing the feed loss. To that end, each integrated circuit 14 preferably is packaged either in a flip-chipped configuration using wafer level chip scale packaging (WLCSP), or a traditional package, such as quad flat no-leads package (QFN package). While other types of packaging may suffice, WLCSP techniques are preferred to minimize real estate on the substrate 16.

In addition to reducing feed loss, using WLCSP techniques reduces the overall footprint of the integrated circuits 14, enabling them to be mounted on the top face of the printed circuit board 16 with the elements 18—providing more surface area for the elements 18.

It should be reiterated that although FIGS. 3A and 3B show the AESA system 10 with some specificity (e.g., the layout of the elements 18 and integrated circuits 14), those skilled in the art may apply illustrative embodiments to other implementations. For example, as noted above, each integrated circuit 14 can connect to more or fewer elements 18, or the lattice configuration can be different. Accordingly, discussion of the specific configuration of the AESA system 10 of FIG. 3A (and other figures) is for convenience only and not intended to limit all embodiments.

Figure 4:
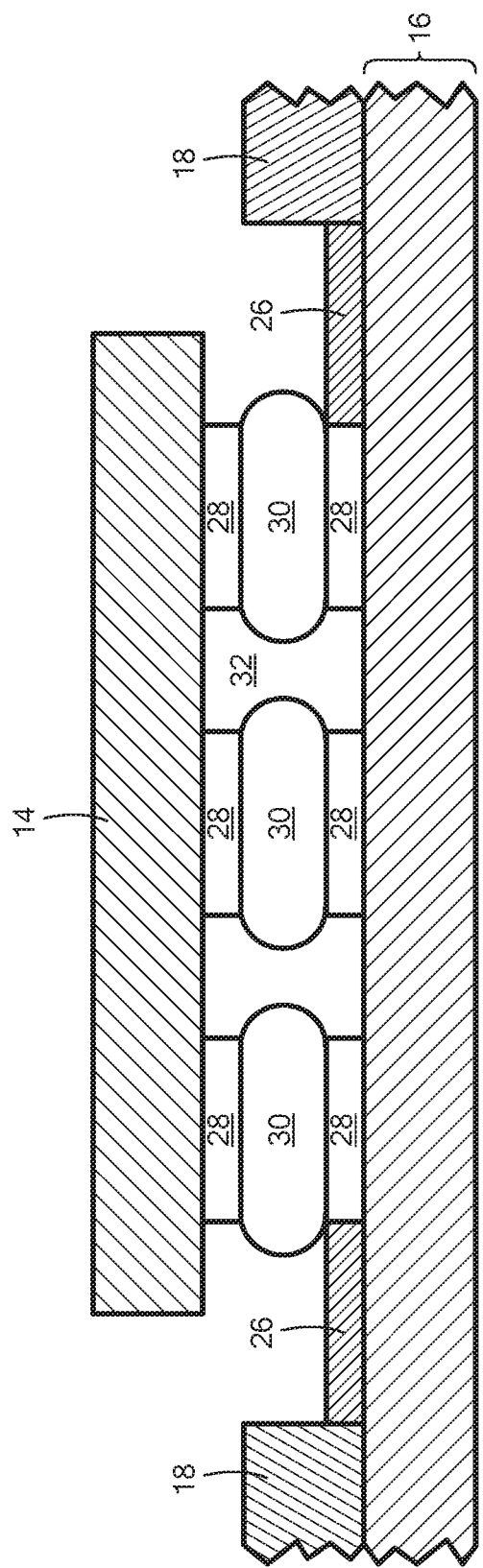
FIG. 4 schematically shows a cross-sectional view of the laminated printed circuit board of FIG. 3A to highlight the mounting of its integrated circuits.

FIG. 4 schematically shows a cross-sectional view of the layout of components on the laminated printed circuit board 16 of 3A to highlight the flip-chip mounting of its integrated circuits 14. The integrated circuit 14 in this drawing intentionally is enlarged to show details of a flip-chip mounting technique. Unlike techniques that permit input/output ("I/O") only on the edge of the integrated circuit 14, flip-chip mounting permits I/O on interior portions of the integrated circuit 14.

As shown, the integrated circuit 14 has a plurality of pads 28 aligned with a plurality of corresponding pads 28 on the printed circuit board 16. These opposing pads 28 on the integrated circuit 14 and the printed circuit board 16 may be considered to form pairs of pads 28. Solder 30 (e.g., solder balls) electrically connects each the pads in corresponding pairs of pads 28. Interconnect lines, traces, and other electrical interconnects on/in the printed circuit board 16 (e.g., lines 26) thus permit the integrated circuit 14 to communicate with other elements 18 through this electrical interface.

The embodiment shown in FIG. 4 forms a space or void (identified by reference number "32") between the bottom of the integrated circuit 14 (from the perspective of this drawing) and the top surface of the printed circuit board 16. This space 32 may remain an open void—containing no material. Some embodiments may take advantage of this extra space 32 to add further components, such as additional circuit elements, without requiring more circuit board space. Alternatively, this space 32 may contain fill material (not shown) for further stability and thermal management of the integrated circuit 14.

Other embodiments, however, still may use similar integrated circuits 14, but not use flip-chip mounting techniques. Instead, other mounting techniques may couple the integrated circuits 14 with the substrate 16. Among other things, those techniques may incorporate surface mounting, or wirebond mounting with the integrated circuit 14 rotated 180 degrees from the orientation of FIG. 4. Similar embodiments may use conventional packaging, such as quad-flat leadframe packages (i.e., "QFN" packages). Accordingly, discussion of flip chip mounting techniques is but one of a variety of different techniques that may be used with various embodiments of the invention.

Figure 5:
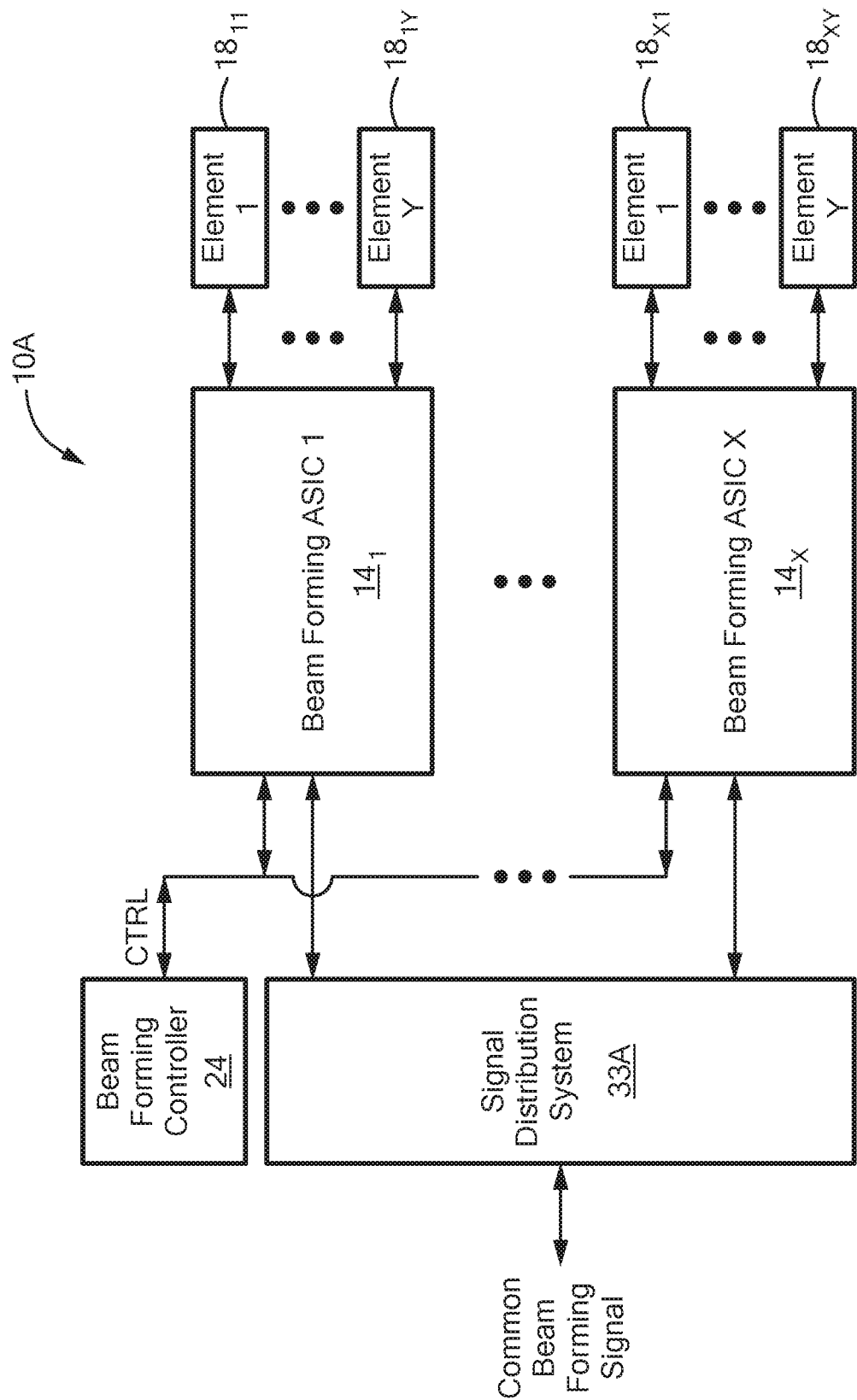
FIG. 5 schematically shows a generic representation of the AESA of FIG. 1 in accordance with illustrative embodiments of the invention.

FIG. 5 schematically shows phased array 10A in accordance with certain exemplary embodiments. Among other things, the phased array 10A includes the noted beam-forming controller 24 for controlling a number of beam-forming integrated circuits 14, and a signal distribution system 33. As shown in this example, the beam-forming integrated circuits 14 and the beam-forming controller 24 can be implemented as application specific integrated circuits (ASICs). However, those skilled in the art will recognize the beam-forming integrated circuits 14 and the controller 24 can be implemented using field programmable gate arrays (FPGAs) or other electronic circuitry.

Each of the beam-forming integrated circuits 14 can support one or more beam-forming elements 18 (e.g., RF antennas for operation in the exemplary radar or 5G system). In this example, the phased array 10A includes X beam-forming integrated circuits $14_1$ to $14_X$, with each of the beam-forming integrated circuits 14 supporting Y beam-forming elements 18. For example, the integrated circuit $14_1$ is electrically coupled to beam-forming elements $18_{11}$ to $18_{1Y}$, and the integrated circuit $14_X$ is electrically coupled to beam-forming elements $18_{X1}$ to $18_{XY}$. Thus, the phased array 10A includes (X*Y) beam-forming elements 18, where X and Y are greater than one.

The phased array 10A of FIG. 5 can be used for transmitting and/or receiving a beam-formed signal via the beam-forming elements 18. Thus, the signal distribution system 33 may be configured to distribute a beam-forming signal STX to each of the beam-forming integrated circuits 14 and/or to produce a combined beam-formed signal SRX from signals received from the beam-forming integrated circuits 14.

In accordance with illustrative embodiments of the invention, each of the integrated circuits 14 of the phased array 10A (or sub-array thereof) has an input connected in parallel to the same input of the other integrated circuits 14 for receiving broadcast messages from the controller 24. This input, referred to herein as a "parallel mode data input," allows the controller 24 to transmit a single control message (e.g., CTRL) in parallel to all of the beam-forming integrated circuits included in the array or sub-array. Accordingly, during operation, the controller 24 can change an operating parameter of the beam-forming integrated circuits 14, such as a beam weighting parameter, much more rapidly than prior art methods known to the inventors. For example, in conventional antenna systems, beam-forming integrated circuits are typically programmed in series.

Figure 6:
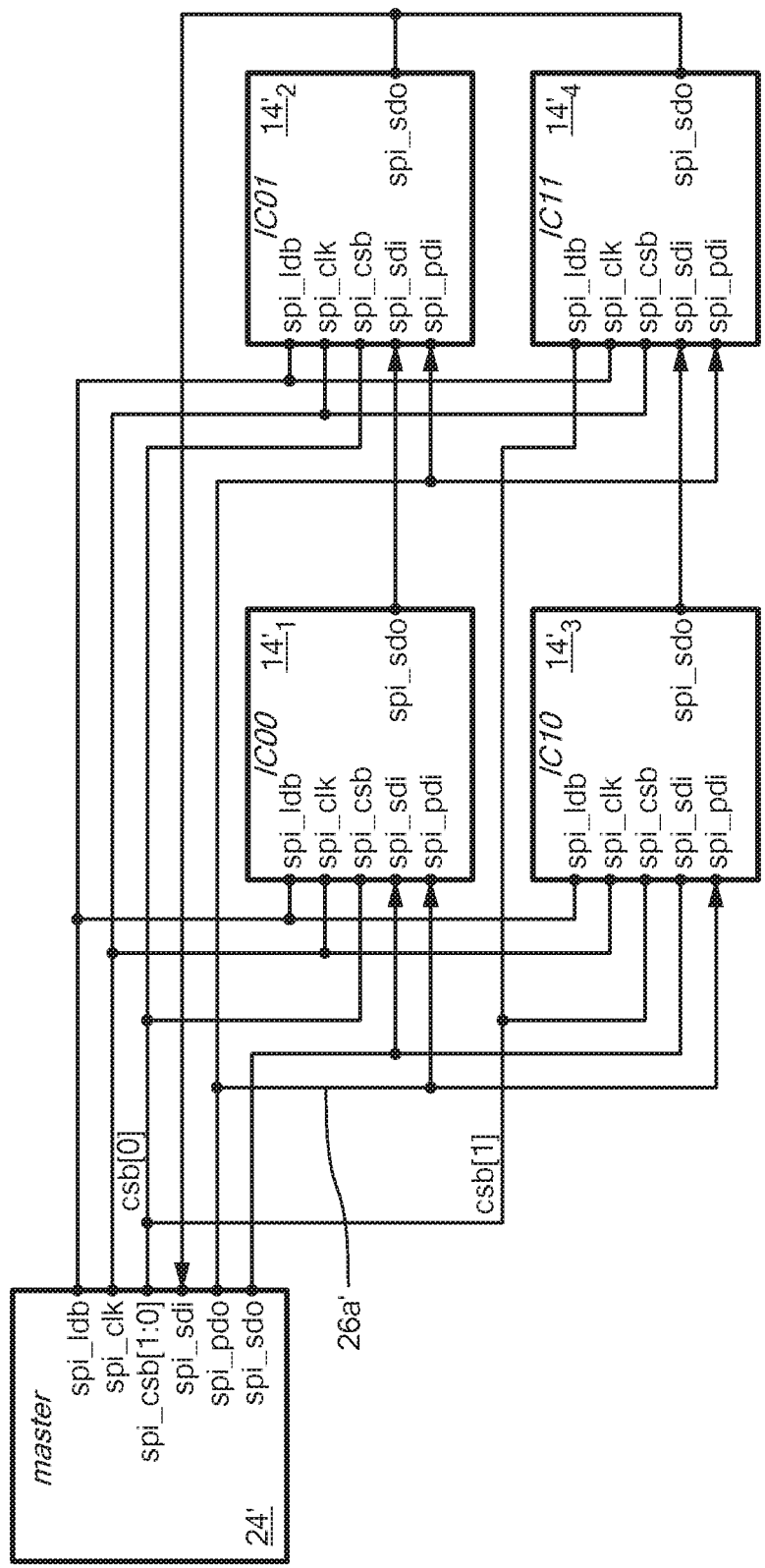
FIG. 6 schematically shows a generic representation of the signal distribution system of the integrated circuits of the AESA in accordance with illustrative embodiments of the invention.

To those ends, FIG. 6 schematically shows an interconnection and pin drawing identifying the various ports of four beam-forming integrated circuits $14_1'$, $14_2'$, $14_3'$, and $14_4'$ (collectively, integrated circuits 14') configured in accordance with illustrative embodiments. It should be noted that four integrated circuits 14' are shown for convenience only and thus, those skilled in the art can apply this technique to more or fewer integrated circuits 14'.

Importantly, each of the beam-forming integrated circuits 14' has a parallel mode data input ("spi_pdi") As shown, a data interconnect 26a' (e.g., a wire or other conductor) electrically connects a parallel mode data output ("spi_pdo") of the controller 24' in parallel with all four parallel mode data inputs ("spi_pdi") of the four integrated circuits 14'. Accordingly, the controller 24' can transmit a single control message from its parallel mode data output ("spi_pdo") over the data interconnect 26a' for parallel reception at the parallel mode data input ("spd_pdi") of all of the beam-forming integrated circuits 14'. For example, using this broadcast transmission technique, the phased array 10A can be configured more rapidly to move its beam or otherwise change one or more other beam characteristics, e.g., to track a satellite or orbiting object.

Each of the beam-forming integrated circuits 14' preferably has one or more additional interfaces for receiving other kinds of signals from the controller 24'. Among others, those interfaces can include:
a clock input ("spi_clk") to receive timing signals,
a serial data input ("spi_sdi") to receive data serially from the controller 24' or another beam-forming integrated circuit 14',
a serial data output ("spi_sdo") to transmit data serially to another beam-forming integrated circuit 14' or the controller 24',
a chip select input ("spi_csb") for enabling the integrated circuit 14' to be programmed, and
a load enable input ("spi_ldb") for loading data into the programmable register sets.

Indeed, some embodiments of the beam-forming integrated circuits 14' may have additional ports for additional functionality. In a similar manner, some embodiments of the beam-forming integrated circuits 14' may have a subset of various combinations these ports. Accordingly, discussion of the specific ports is by example only and not intended to limit various embodiments the invention.

As discussed in more detail below, in some embodiments, the phased array 10A can be operated in a serial mode, a parallel mode, or a hybrid mode. To those ends, as shown in the illustrated embodiment, the controller 24' and the beam-forming integrated circuits 14' can be arranged in a daisy chain configuration using the serial data interfaces "spi_sdi" and "spi_sdo" to facilitate operation in "serial mode." For purposes of example only, a first daisy chain is formed by the controller 24' and the beam-forming integrated circuits $14_1'$ and $14_2'$, and a second daisy chain is formed by the controller 24' and the beam-forming integrated circuits $14_3'$ and $14_4'$.

When operating the first daisy chain in serial mode, the controller 24' can serially write a control message containing data for subsequent configuration of the beam-forming integrated circuits $14_1'$ and $14_2'$ of the first daisy chain. The control message can be clocked from the serial data output "spi_sdo" of the controller 24' through the serial data input "spi_sdi" of the first integrated circuit $14_1'$. The serial data output "spi_sdo" of the first integrated circuit $14_1'$ successively feeds the serial data input "spi_sdi" of the next integrated circuit $14_2'$ until the control message is clocked across all of the beam-forming integrated circuits $14_1'$ and $14_2'$ in the chain. Thereafter, the controller 24' can transmit a load enable signal to the load enable input "spi_ldb" of the respective integrated circuits $14_1'$ and $14_2'$ that causes the data included in the control message to be written into an internal register address specified in the control message.

Figure 7:
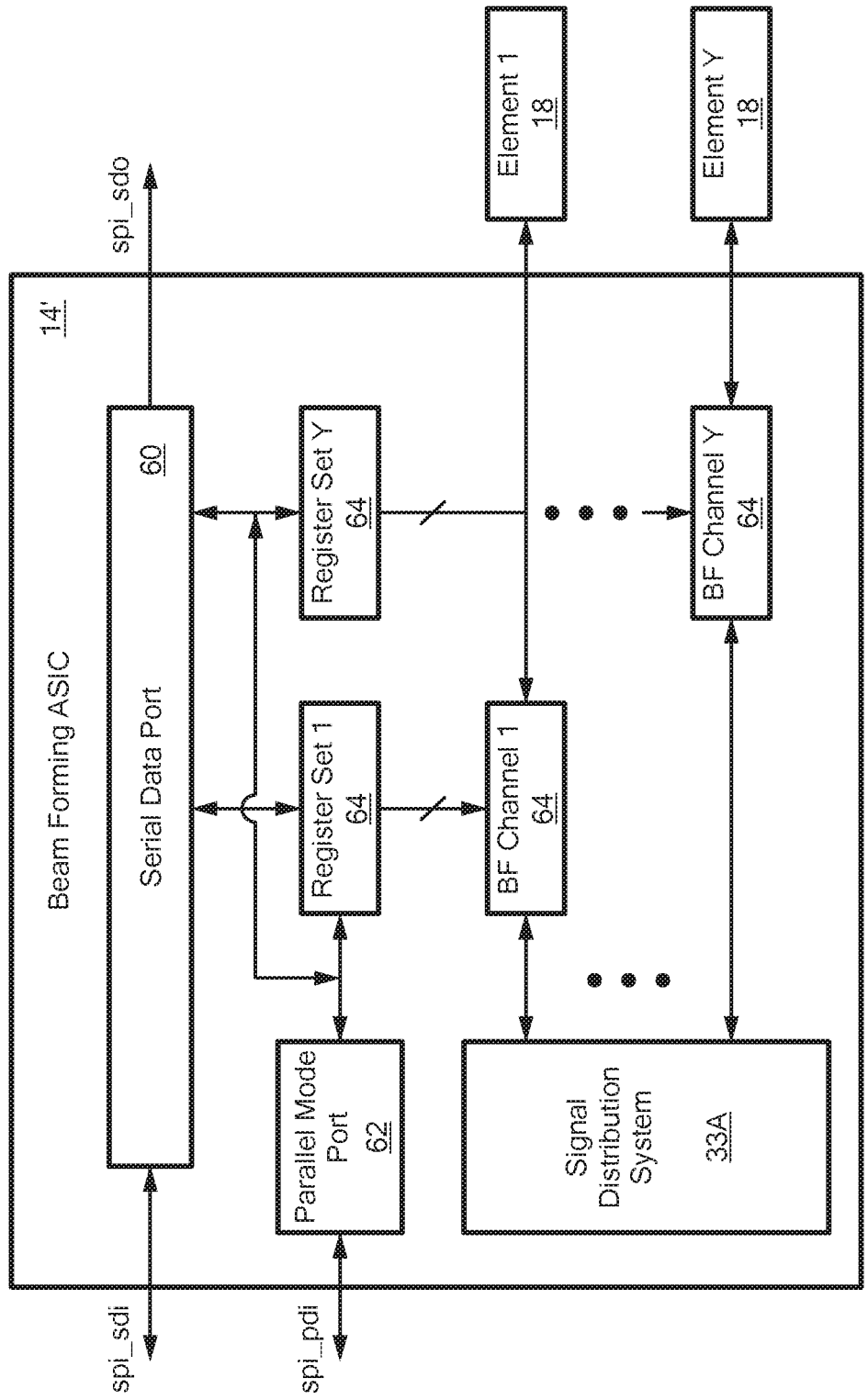
FIG. 7 schematically shows additional details of a beam-forming integrated circuit configured in accordance with illustrative embodiments of the invention.

FIG. 7 schematically shows additional details of the beam-forming integrated circuit 14' configured in accordance with illustrative embodiments of the invention. As shown, the integrated circuit 14' includes a serial data interface port 60 and a "parallel mode" data interface port 62. The serial data interface port 60 receives serial messages via the serial data input "spi_sdi" and transmits serial messages via the serial data output "spi_sdo." The parallel mode data interface port 62 receives data via the parallel mode data input "spi_pdi,"

In some embodiments, the "parallel mode" data interface port 62 can be implemented as a serial data interface port, such as a Serial Peripheral Interface (SPI) port. SPI ports typically exhibit low power dissipation and complexity. SPI ports are also typically easier to interface with commercially available controller FPGAs and ASICs, which usually have many General Purpose Input/Output (GPIO) and SPI ports. In some embodiments, the parallel mode data interface port 62 can be parallel data interface port, such as a Peripheral Component Interconnect (PCI) port. However, parallel ports typically exhibit higher power dissipation, require more complex circuitry/implementation, and have many interface pins which increases the cost of the integrated circuit.

Each of the data interface ports 60 and 62 is connected to memory for storing various different operating parameters of the phased array 10A. In illustrative embodiments, the memory is implemented in the form of a register bank having addressable and programmable register sets 64. Accordingly, among other functions, the serial data interface port 60 and/or the parallel mode data interface port 62, as well as logic associated with those ports 60 and 62, may forward control/data messages to one or more of the register sets 64, thereby causing an intended change in the operation of the phased array 10A. For example, the parallel mode data interface port 62 may receive a message indicating a change of address to retrieve beam steering data from a specific register of the register sets 64. This new beam steering data may be used to transmit a beam along a different trajectory. Accordingly, the registry sets 64 are used to configure the beam-forming channels 68 that are electrically coupled to one or more of the beam-forming elements 18.

Those skilled in the art will recognize that the beam-forming channels 68 can include a transmit chain, a receive chain, or both. A transmit chain can be configured to transmit signals through a corresponding one of the beam-forming elements 18. A receive chain can be configured to receive signals from a corresponding one of the beam-forming elements 18. Each chain can include various components including a signal attenuator, a phase shifter, a frequency converter, and/or a gain amplifier (not shown). The beam steering data retrieved from one or more of the register sets 64 can be used to configure one or more of the components of the beam-forming channels 68.

The beam-forming integrated circuit 14' also may include an internal signal distribution system 33A for transmitting or receiving a common beam-forming signal to and/or from each of Y beam-forming channels 68. Each register set 64 thus has data for configuring each of the Y beam-forming channels 64. Each register set 64 thus may include one or more registers for programming the complex beam weight of a corresponding beam-forming channel 68. For example, each register set 64 may include a single register that stores a word including both gain/amplitude and phase parameters for its corresponding beam-forming channel. Alternatively, each register set 64 may include separate registers that are used to store separate gain/amplitude and phase parameters for a corresponding one of the beam-forming channels 68.

Each beam-forming integrated circuit 14' may operate in any of three modes, and may be switchable between each of these modes:
- serial mode, which uses the serial data interface port 60 only
- parallel mode, which uses the parallel mode data interface port 62 only,
- hybrid mode, which uses both the serial data interface port 60 and the parallel mode data interface port 62.

For example, in "serial mode" operation, serial data received on the serial data input "spi_sdi" is shifted onto the serial data interface port 60. The serial data interface port 60 can write that data to one or more of the register sets 64 and/or can shift that data out through the serial data output "spi_sdo" to another integrated circuit 14' or the controller 24'. As discussed above, with respect to FIG. 6, "serial mode" operation can be useful, if not necessary, to pre-program the register sets 64 of a daisy-chained set of integrated circuits with unique data.

In "parallel mode" operation, serial data received from the controller 24' on the parallel mode data input "spi_pdi" is shifted into the "parallel mode" data interface port 62. The parallel mode data interface port 62 can write that data to one or more of the register sets 64. Thus, operating the integrated circuits 14' in parallel mode allows the controller 24' to broadcast commands in parallel to all beam-forming integrated circuits 14' in the array, such as but not limited to a set of fast-access write commands that enable fast beam switching, among other things.

"Hybrid mode" operations combines serial mode and parallel mode operation into a single transaction. For example, "hybrid mode" operation may be used to provide a serial mode write/read of data words through all the beam-forming integrated circuits 14' in a daisy chain, preceded by a single control word sent in the parallel mode. In this case, the transaction may start in parallel mode using the parallel mode data interface port 62. After the control word is latched, however, the data shifts through the daisy chain of beam-forming integrated circuits 14' using the serial data interface port 60 of the respective integrated circuits. Thus, hybrid mode has the advantage of transmitting the control word only once.

Those skilled in the art will recognize that modern phased arrays, especially those used in the latest generation of communication systems, often require the capability of switching between different beam directions at a high speed (sometimes referred to herein as "fast beam switching" or FBS). The on-chip programmable register banks included in the beam-forming integrated circuits 14' help to enable this functionality. Typically, the register sets 64 are programmed at start up before operation begins. In some embodiments, each register set 64 may store phase-shift settings and optionally gain/amplitude settings for programming each beam-forming channel 68 and corresponding beam-forming element(s) 18 in the phased array 10A at runtime. For example, each of group of beaming channel/element settings may correspond to a different array beam direction. Other embodiments, however, may program these memories at a later time.

As suggested above, the registers in the register sets 64 are typically accessed by means of an address word. In illustrative embodiments, each address corresponds to a different beam direction for the phased array 10A. By changing the address, e.g., through the parallel mode data interface port 62 or the serial data interface port 60, the phased array 10A can more rapidly retrieve different data to change the direction of the beam. As discussed above, by controlling the beam-forming integrated circuits 14' in parallel mode, the beam direction can be changed rapidly, resulting in shorter beam switching times. For example, in some embodiments, a phased array 10A can be configured to switch between approximately 512 beam directions, such that the phased array 10A can be switched between any two beam directions in less than 15 clock cycles (e.g., measured in periods of a clock signals transmitted to the clock input "spi_clk" of the respective integrated circuits)

Illustrative embodiments can also enable three-dimensional beam steering (TDBS). Specifically, three-dimensional beam steering, as known by those skilled in the art, refers to the capability of applying different amplitude weights to different beam-forming elements 18 in the phased array 10A. This technique therefore can shape the array beam, for example, to reduce the side-lobe level. Individual beam-forming elements 18 can be switched off to reduce DC power consumption, which effectively resizes the phased array 10A. Three-dimensional beam steering is often considered to encompass a number of features, such as array taper control, aperture control/reconfiguration, and dynamic array resizing. The amplitude weight settings can be stored in the noted register sets 64 to enable fast programming. Moreover, the amplitude weights can be stored in the same or different registers than those of other operating parameters, such as fast beam steering registers.

Illustrative embodiments can also utilize the parallel mode data interface port 62 to optimize temperature compensation processes. For example, the beam-forming integrated circuits 14' may modify certain operating parameters (e.g., gain settings) for each beam-forming channel 68 and corresponding beam-forming element(s) 18 in the phased array 10A as a function of the temperature. To that end, the system 10 may have variable gain RF circuitry that can be programmed using the serial data interface port 60 and/or the parallel mode data interface port 62. As with the various configuration settings for three-dimensional beam steering and fast beam switching, the different gain settings that may be required to compensate the gain settings as a function of temperature may be stored in the same or different memories or registers than those of the other types of data. Use of the parallel mode data port 62 enables the array gain to be rapidly adjusted as the temperature of the array varies. This feature also can compensate for temperature gradients across the beam-forming integrated circuits 14' in the phased array 10A by programming the gain setting of each beam-forming integrated circuit 14' based upon its position on the phased array 10A.

Indeed, those skilled in the art may change other operating parameters of the phased array 10A in additional ways. For example, the parallel mode can be used to rapidly control receiver linearity. More specifically, in common communication systems, programmable receiver linearity is desirable to control the signal-to-noise ratio at the receiver output as a function of the input power. Accordingly, when an RF input signal received by the beam-forming elements 18 is weak, high gain and low noise figure at the receiver is desired. Conversely, when a received input signal strong, a lower gain and higher noise figure can be tolerated and typically is desired to maintain signal fidelity.

Next-generation communication systems, based on phased arrays, may require the receiver to communicate with multiple transmitters a different distances from the receiver. If one of the transmitters is much closer to the receiver than the other transmitter, then the power of the two signals may vary by an order of magnitude relative to each other. To maintain communication with both transmitters, the receiver gain therefore may be adjusted on a frame-to-frame basis (i.e., each frame corresponding to one transmitter). For example, in some embodiments, the beam-forming integrated circuits 14' can be operated in parallel mode to reduce the gain of all of the integrated circuits of the phased array 10A, while improving receiver linearity. Since the length time needed to perform a parallel mode transaction is typically much shorter than typical communication frame length, receiver gain can be changed on a frame-to-frame basis.

Discussion of specific uses of the serial data interface port 60, the parallel mode interface port 62 in conjunction with the programmable register sets 64 disclosed here are illustrative and not intended to limit all embodiments of the invention.

Various embodiments apply to either or both the transmit and receive modes of the phased array 10A. In fact, the beam-forming integrated circuit 14' may have features that provide more flexibility in the various operations for both modes. For example, the same or different register sets 64 may be used for either or both the transmit and receive modes. Similarly, both modes may share addresses or use separate addresses.

Figure 8:
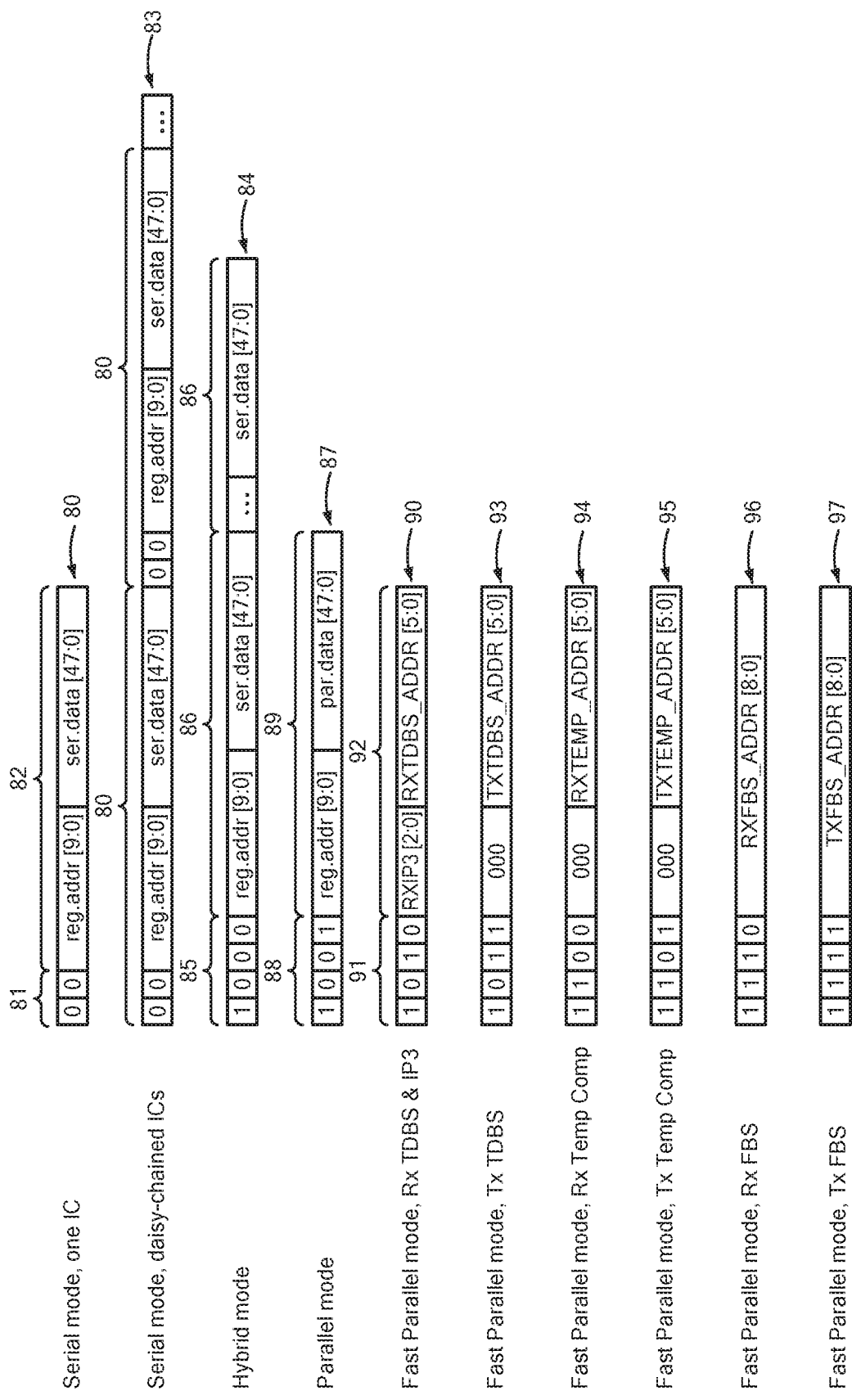
FIG. 8 generally shows an example of different functions and the structure of a message implementing those functions in accordance with illustrative embodiments of the invention.

FIG. 8 shows an example of how different functions may be implemented in illustrative embodiments of the phased array 10A. In this example, control messages are shown in which the first two or four bits may act as a control word to identify the function, while the remainder of the message includes a data word for that identified function.

In the illustrated embodiments, control message 80 shows an exemplary format for performing a "serial mode" transaction using the serial data interface port 60 of a single beam-forming integrated circuit 14'. As shown, the control word 81 ("00") identifies the function as a serial write command for one integrated circuit and the data word 82 includes a 48-bit serial data to be written at a specified 10-bit register address.

Control message 83 shows an exemplary format for performing a "serial mode" transaction using the serial data interface ports 60 for a set of daisy-chained beam-forming integrated circuits 14'. As shown, the control message 83 includes multiple control messages 80 for serially programming each of the respective integrated circuits 14' in the chain. Each of the individual control messages 80 within the control message 83 can include the same or different 48-bit serial data to be written at the same or different 10-bit register address in the respective integrated circuits.

Control message 84 shows an exemplary format for performing a "hybrid mode" transaction using the serial data interface ports 60 and the parallel mode data interface ports 62 for a set of daisy-chained beam-forming integrated circuits 14'. As shown, the control word 85 ("1000"), which identifies the function as a hybrid write command, is broadcast over the parallel mode data interface ports 62 of the respective beam-forming integrated circuits 14'. The data word 86 includes a 48-bit serial data to be written at a specified 10-bit register address using the serial data interface ports 60 of each integrated circuit.

Control message 87 shows an exemplary format for performing a "parallel mode" transaction using the parallel mode data interface ports 62 of a set of beam-forming integrated circuits 14'. As shown, the control word 88 ("1001") identifies the function as a parallel write command that is broadcast to all of the beam-forming integrated circuits 14' in the set. The data word 89 includes a 48-bit serial data to be written at a specified 10-bit register address in each of the integrated circuits. In this example, the same data is written to each of the parallel-connected integrated circuits.

Control message 90 shows an exemplary format for performing a "parallel mode" transaction using the parallel mode data interface ports 62 of a set of beam-forming integrated circuits 14'. As shown, the control word 91 ("1010") identifies the function as a 3D receive beam steering switch command that is broadcast to all of the beam-forming integrated circuits 14' in the set. In this example, the data word 92 includes a 6-bit register address (i.e., RXTDBS_ADDR) from which to retrieve a gain setting or other beam-forming data to change the shape or other characteristic of the receive beam. Although the beam-forming integrated circuits 14' access the same register address in one or more of its register sets 64, the gain settings configured for each beam-forming channel 68 and corresponding beam-forming element 18 can be different. The data word 92 also includes an additional 3-bit gain setting value (i.e., RXIP3[2:0]) for changing the receiver linearity associated with the beam-forming channels 68 and corresponding beam-forming elements 18 in each of the integrated circuits. Control messages 93, 94, 95, 96, and 97 show exemplary formats for performing other "parallel mode" transactions to change the configuration settings of the beam-forming channels 68 and corresponding beam-forming elements 18 in a set of parallel-connected integrated circuits 14' so that the phased array 10A produces a desired beam characteristic. For example, control message 93 can be used to perform 3D transmit beam steering. Control messages 94 and 95 can be used to adjust the gain settings of a receive beam and a transmit beam, respectively, to compensate for temperature fluctuations. Control messages 96 and 97 can be used to perform fast beam switching of a receive beam and a transmit beam, respectively.

Figure 9:
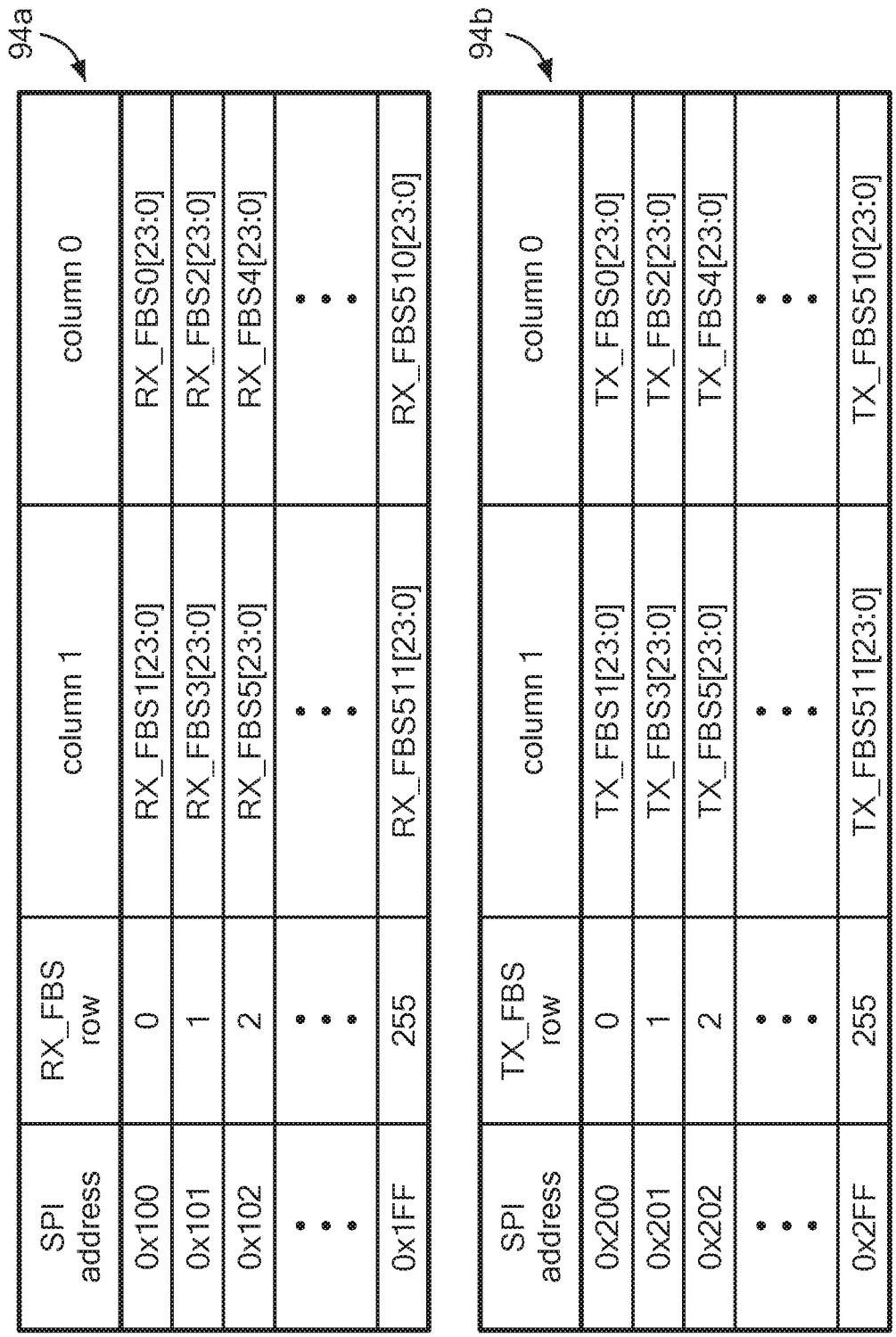
FIG. 9 generically shows an example of various addressable registers that may be used with illustrative embodiments of the invention.

FIG. 9 shows an exemplary structure for the register sets shown in the preceding figures. In this example, the register set 94a stores a number of phase shift settings RX_FBS0 to RX_FBS511 with each phase shift setting for weighting a receive beam. Each of the 512 phase shift settings can be stored at a specific address in the register set 94a, where each address corresponds to one of many beam steering directions (e.g., 512 beam steering directions). All of the beam-forming integrated circuits 14' preferably have a related register set configuration so that receipt of a single address at all of the different beam-forming integrated circuits 14' causes each beam-forming integrated circuit 14' to retrieve data from the same address (or cell) in its respective memory. Although the beam-forming integrated circuits 14' are retrieving data from corresponding cells, the actual data in those cells may be different across the integrated circuits 14' to properly steer the beam. The register set 94b has a similar configuration in which a number of phase shift settings TX_FBS0 to TX_FBS511 with each phase shift setting for weighting a receive beam. Like the receive register set 94a, each of the 512 phase shift settings in the transmit register set 94b is stored at a specific address that corresponds to one of many beam steering directions (e.g., 512 beam steering directions).

Illustrative embodiments may have similar or different register structures for the other functions, such as the phase data, three-dimensional beam steering data, temperature concentration data, and receiver linearity data, among other things.

Figure 10:
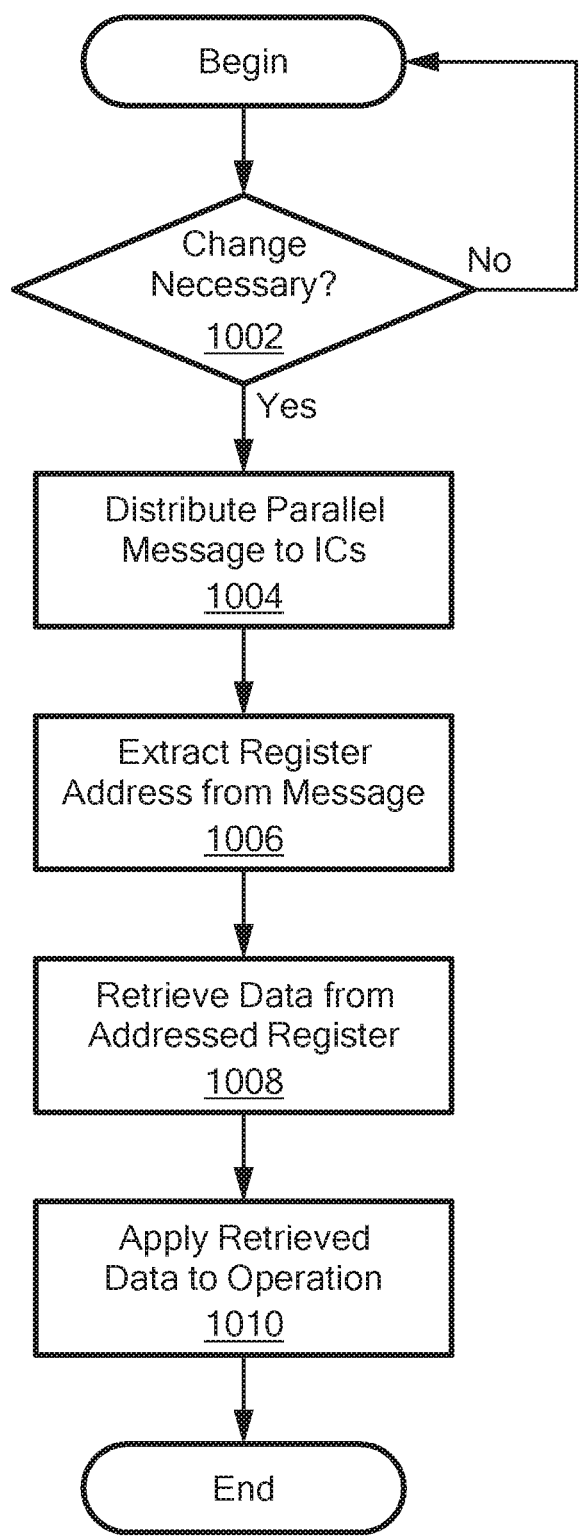
FIG. 10 shows a process of using the AESA in accordance with illustrative embodiments of the invention.

FIG. 10 shows a process of using the AESA in accordance with illustrative embodiments of the invention. It should be noted that this process is substantially simplified and may have additional steps—it is merely an example. Accordingly, the process of using the AESA system 10 may have many additional steps not discussed. In addition, some of the steps may be performed in a different order than that shown, or at the same time. Those skilled in the art therefore can modify the process as appropriate.

The process of FIG. 10 begins at step 1002, in which the process determines if changes are necessary to some operating parameter of the AESA system 10. For example, logic may indicate that the direction of the beam must be changed. In that case, the process continues to step 1004, in which the controller 24 distributes parallel messages to the various beam-forming integrated circuits 14'. Those messages may include control data indicating the function to be changed and address data identifying the addresses of the registers for the new data. In illustrative embodiments, those messages are forwarded through the parallel mode data interface ports 62 of the various beam-forming integrated circuits 14'.

Next, the integrated circuits 14' extract the register address from the messages at step 1006, and retrieve the data from their respective registers having the address in the message at step 1008. Continuing with the above example, that retrieved data may include new amplitude and/or phase information for the beam. At step 1010, the process concludes when the integrated circuits 14' apply the retrieved data to the operation in question. In the above example, the new amplitude and/or phase information may be applied to the various beam-forming channels 68 and/or the corresponding beam-forming elements 18, changing the direction of the transmitted beam.

Accordingly, illustrative embodiments use the parallel-mode data ports 62 of the various beam-forming integrated circuits 14 to more rapidly change operations of the AESA system 10, providing a more robust and responsive solution.

Although the above discussion discloses various exemplary embodiments of the invention, it should be apparent that those skilled in the art can make various modifications that will achieve some of the advantages of the invention without departing from the true scope of the invention.

What is claimed is:

1. A phased array system comprising:
   a signal distribution system;
   a plurality of beam-forming elements; and
   a plurality of beam-forming integrated circuits in communication with the beam-forming elements,
   each beam-forming integrated circuit having a corresponding register bank comprising a plurality of addressable and programmable register sets,
   each beam-forming integrated circuit having a serial data port for receiving serial messages that manage data in the register bank,
   each beam-forming integrated circuit having a parallel mode data port in communication with the signal distribution system for receiving broadcast messages having register address information that manage the data in the register bank, the broadcast messages received in parallel with the other beam-forming integrated circuits among the plurality of beam-forming integrated circuits via the signal distribution system, wherein the plurality of beam-forming integrated circuits includes a first beam-forming integrated circuit and a second beam-forming integrated circuit, the serial data port of the first beam integrated circuit including a first serial data input and a first serial data output, the serial data port of the second beam-forming integrated circuit including a second serial data input and a second serial data output, the first serial output port coupled with the second serial input port, the first serial input port coupled with an upstream serial data output of another of the plurality of beam-forming integrated circuits, the second serial output port coupled with a downstream serial data input of yet another of the plurality of beam-forming integrated circuits.

2. The phased array system of claim 1, further comprising a controller that communicates with the plurality of beam-forming integrated circuits, the controller having a parallel mode data output coupled with the parallel mode data port of each beam-forming integrated circuit via the signal distribution system.

3. The phased array system of claim 1, wherein the plurality of beam-forming integrated circuits are switchable between any of a serial mode to receive data in the serial data port only and a parallel mode to receive data in the parallel mode data port only.

4. The phased array system of claim 3, wherein the plurality of beam-forming integrated circuits are switchable to or from a hybrid mode that receives data in both the serial mode and the parallel mode.

5. The phased array system of claim 1, wherein the programmable register sets of each beam-forming integrated circuit include receiver linearity data.

6. The phased array system of claim 1, wherein the programmable register sets of each beam-forming integrated circuit include phase data corresponding to different beam characteristics of the phased array system.

7. The phased array system of claim 1, wherein the programmable register sets of each beam-forming integrated circuit include gain data corresponding to different beam characteristics of the phased array system.

8. The phased array system of claim 1, wherein the programmable register sets of each beam-forming integrated circuit include three-dimensional beam steering data corresponding to different beam characteristics of the phased array system.

9. The phased array system of claim 1, wherein the programmable register sets of each beam-forming integrated circuit include gain compensation data to compensate for temperature fluctuations of the system.

10. The phased array system of claim 1, wherein each beam-forming integrated circuit includes an ASIC.

11. The phased array system of claim 1, where each beam-forming integrated circuit includes at least one of a clock input for receiving a reference clock signal, a chip select input for enabling the integrated circuit to be programmed, or a load enable input for loading data into the programmable register sets.

12. The phased array system of claim 1, wherein for each beam-forming integrated circuit, the serial data port comprises a serial data input and a serial data output.

13. The phased array system of claim 1, wherein the plurality of beam-forming integrated circuits form a daisy chain coupled via their respective serial data ports.

14. The phased array system of claim 1, wherein each beam-forming integrated circuit has a plurality of channels, the programmable register sets in each integrated circuit having data for programming each of the plurality of channels.

15. The phased array system of claim 1, wherein the plurality of beam-forming integrated circuits comprises one or more of a receive only beam-forming integrated circuit, a transmit only beam-forming integrated circuit, or a dual transmit/receive beam-forming integrated circuit.

16. A method of controlling a phased array system, the method comprising:

providing a phased array system according to claim 1; and distributing a broadcast message having register address information to the plurality of beam-forming integrated circuits, via their respective parallel mode data ports, in parallel across a signal distribution system for managing the data in the register banks of the plurality of beam-forming integrated circuits.

17. The method of claim 16, wherein the phased array system emits a beam having desired beam characteristics, and wherein the data in the register banks of the plurality of beam-forming integrated circuits control the operation of the phase array system to emit the beam.

18. The method of claim 16, further comprising setting the phased array system in a serial mode to receive data in the serial data port only, a parallel mode to receive data in the parallel mode data port only, or a hybrid mode that receives data in both the serial mode and the parallel mode.

19. The method of claim 16, wherein the programmable register sets of each beam-forming integrated circuit include receiver linearity data.

20. The method of claim 16, wherein the programmable register sets of each beam-forming integrated circuit include phase data corresponding to different beam characteristics of the phased array system.

21. The method of claim 16, wherein the programmable register sets of each beam-forming integrated circuit include gain data corresponding to different beam characteristics of the phased array system.

22. The method of claim 16, wherein the data in the register banks of the plurality of beam-forming integrated circuits apply different amplitude weights to different ones of the beam-forming elements.

23. The method of claim 16, wherein the data in the register banks of the plurality of beam-forming integrated circuits change gain data as a function of temperature fluctuations in the phased array system.

24. The method of claim 16, further comprising receiving a serial message at the serial data port of a first of the beam-forming integrated circuits and forwarding the serial message to a daisy chain of serial data ports of a plurality of different beam-forming integrated circuits.

25. The method of claim 16, wherein the plurality of beam-forming integrated circuits comprises one or more of receive only beam-forming integrated circuits, transmit only beam-forming integrated circuits, or dual transmit/receive beam-forming integrated circuits.

* * * * *